May 21, 1940.  L. J. JORDAN  2,201,180
APPARATUS FOR CUTTING THREAD OR THE LIKE
Filed Nov. 18, 1938  4 Sheets-Sheet 4

Inventor
Lavern J. Jordan
By Charles L. Herrstrom
Attorney

Patented May 21, 1940

2,201,180

UNITED STATES PATENT OFFICE 2,201,180

APPARATUS FOR CUTTING THREAD OR THE LIKE

Lavern J. Jordan, Fairview Village, Ohio, assignor to Industrial Rayon Corporation, Cleveland, Ohio, a corporation of Delaware Application November 18, 1938, Serial No. 241,240

19 Claims. (Cl. 164—61)

This invention relates to cutting apparatus adapted to reduce continuous lengths of thread or the like, for example, continuous bundles of filaments, into fibers of staple length.

Among other things, the invention provides apparatus of this sort adapted for use in a system of manufacturing staple fiber employing continuously functioning means for forming and processing the filament bundles ("thread"). In view of the fact that it can be operated without difficulty over long periods of time, the cutting apparatus of the invention may be employed to particular advantage in this connection. It also has the advantage that it embodies means which operate to halt the cutting operation in the event of deviation of the thread from its normal path of travel, as a result, for example, of breakage or tangling of the thread, without making it necessary to discontinue the operation of the continuously functioning forming and processing equipment. The cutting apparatus of the present invention provides still other features, disclosed at greater length hereinafter, which adapt it particularly well to use in the manufacture of staple fiber.

For convenience, the cutting apparatus of the present invention will be described in connection with the manufacture of staple fiber by a process generally similar to that shown, described and claimed in application Serial No. 144,582, filed May 25, 1937, by Hayden B. Kline and Lavern J. Jordan. Like that of said prior application, the invention of the present application may be employed in the manufacture of a variety of types of staple fiber, such as that formed from viscose, cellulose acetate, cuprammonium cellulose solution, casein, etc., in addition to which it may, if desired, be used in the manufacture of staple fiber produced by still other processes and by means of other types of thread-producing apparatus. As in said prior application, the invention will be described in connection with the manufacture of viscose staple fiber.

Figure 1:
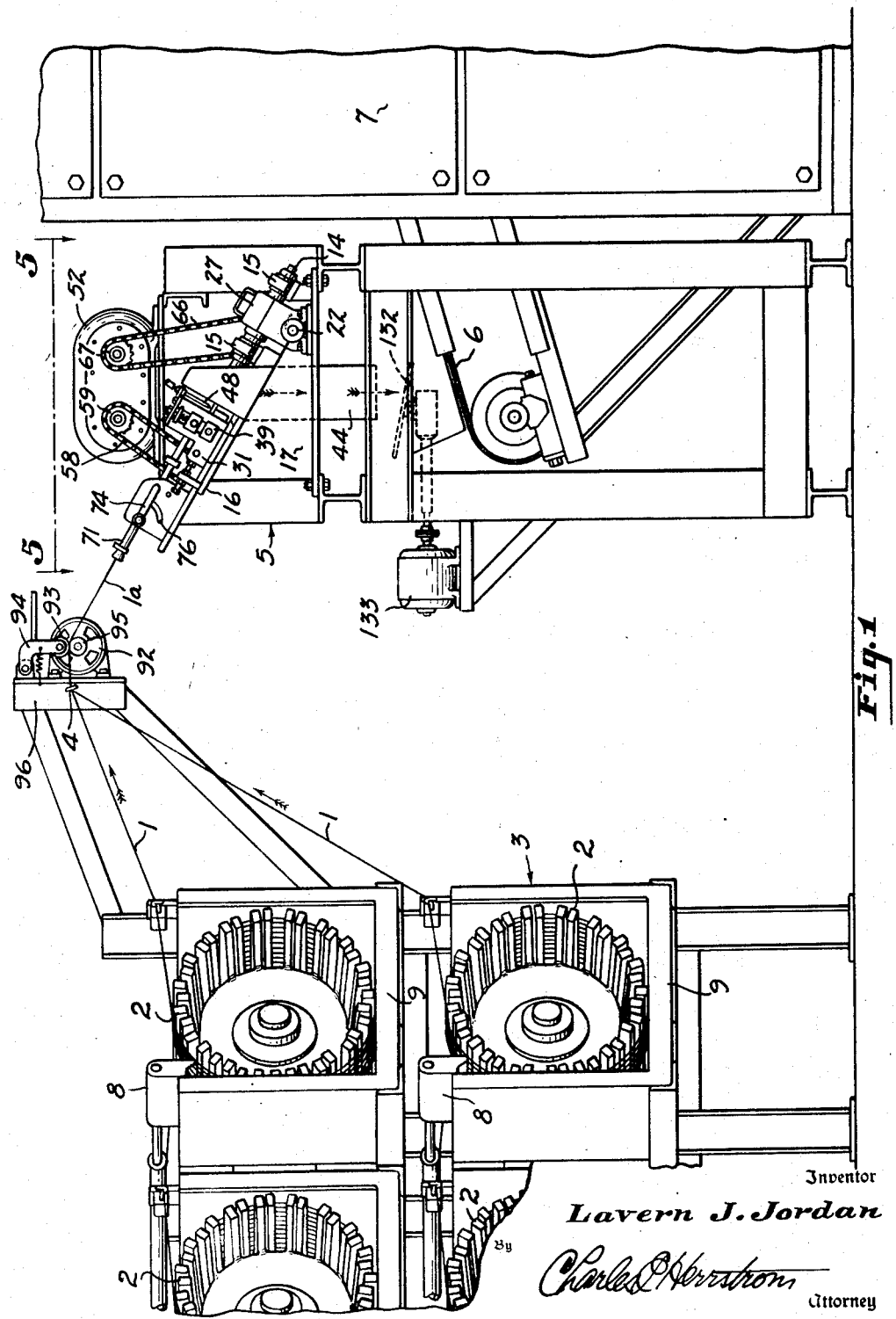
Figure 2:
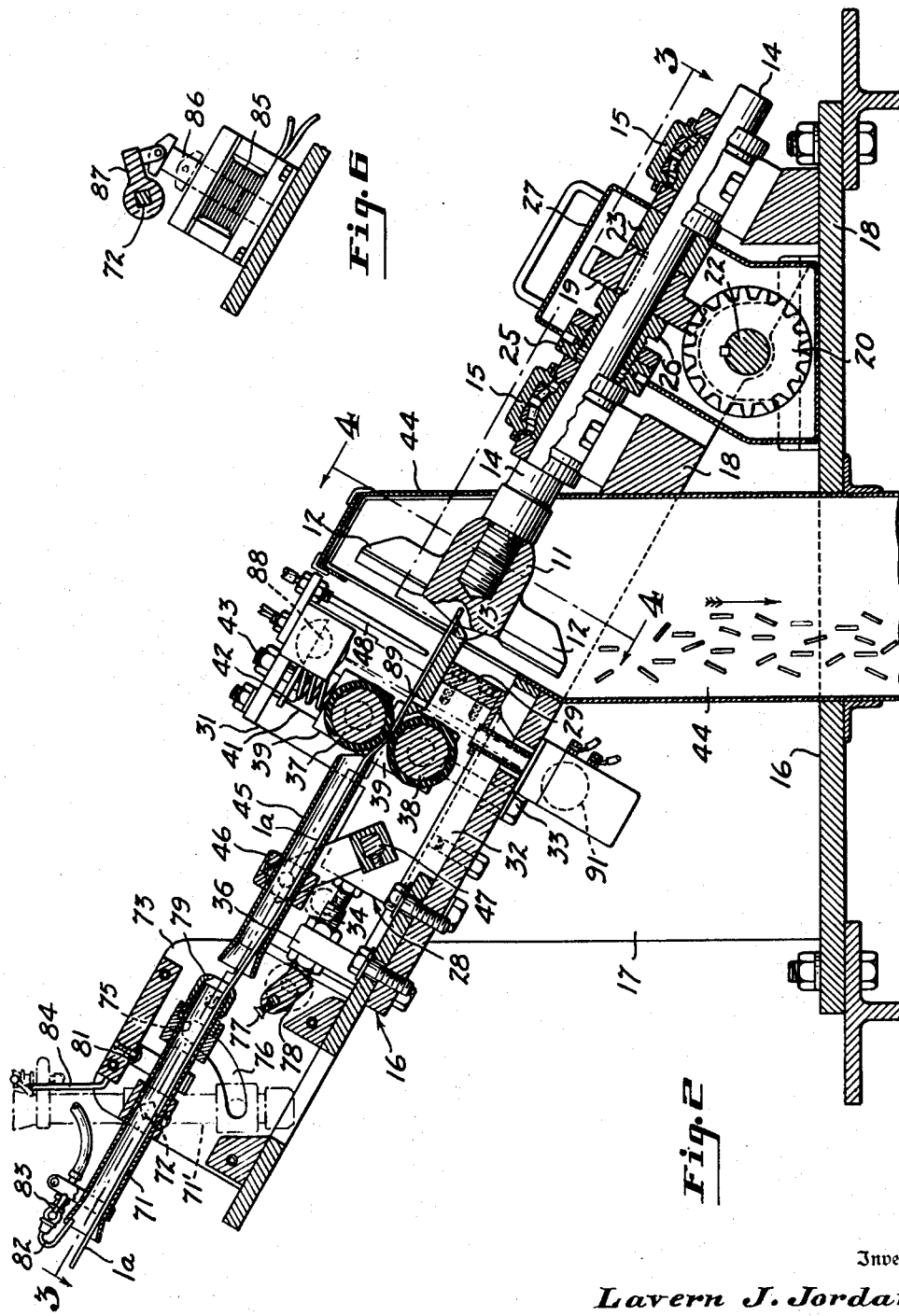
Figure 3:
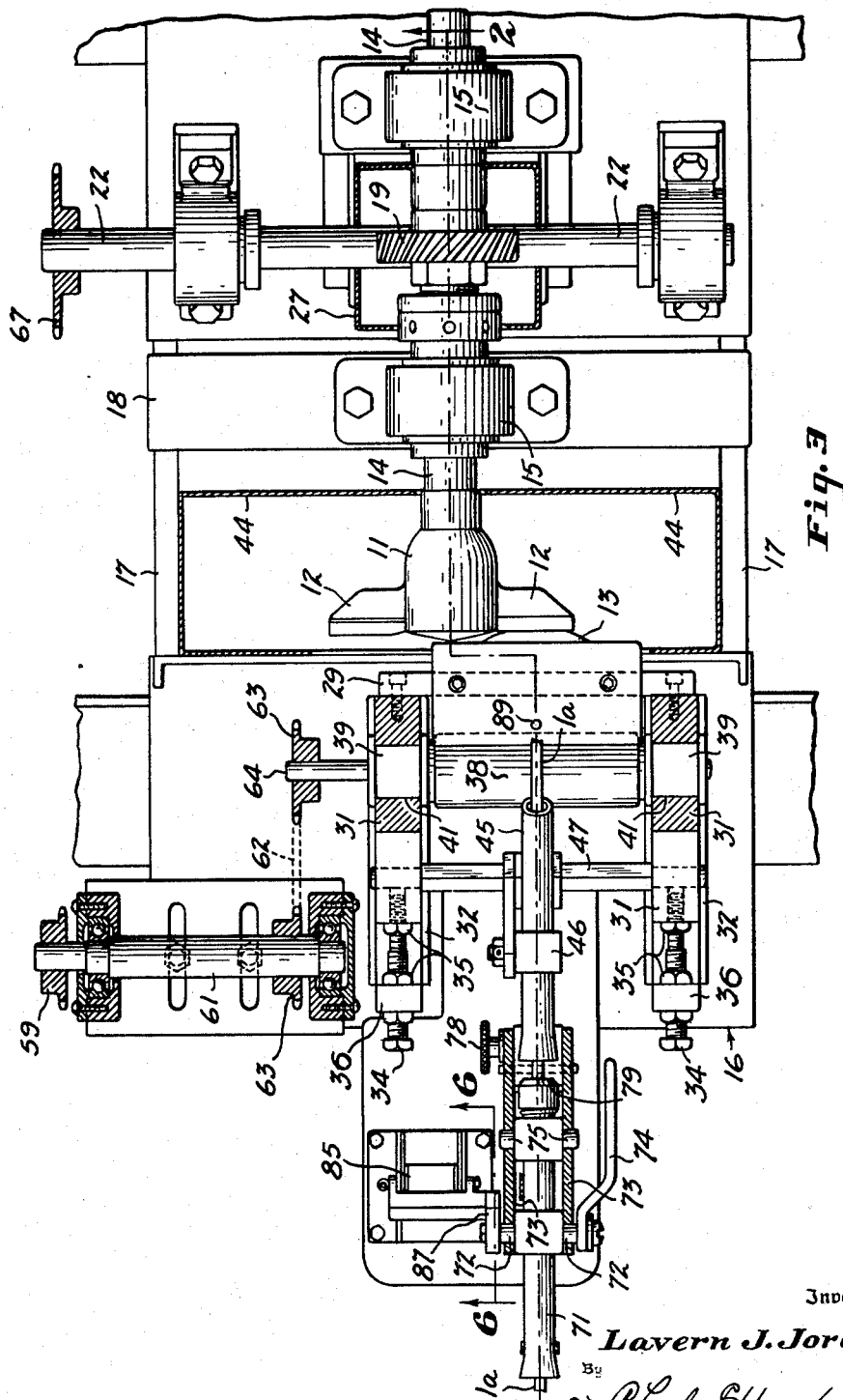
Figure 4:
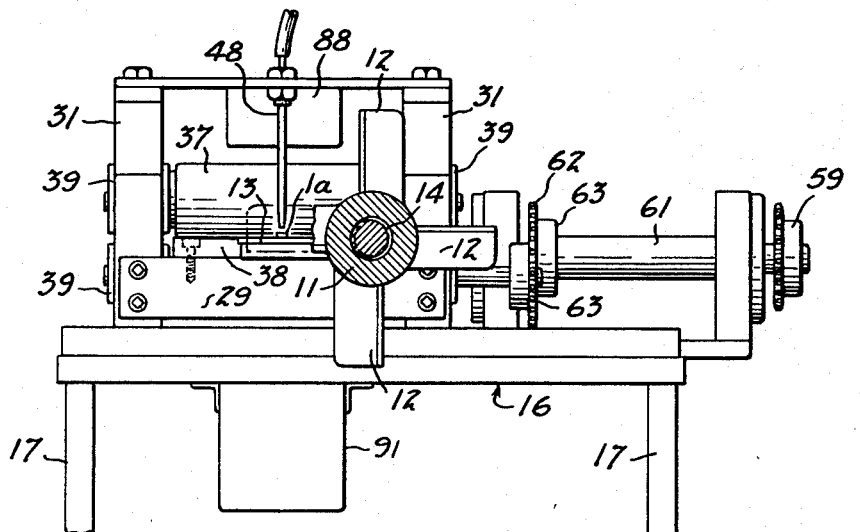

In the drawings, Figure 1 shows a side elevation of cutting apparatus embodying the invention as employed in conjunction with continuous processing equipment of the type disclosed in application Serial No. 144,582. Figure 2 is a longitudinal section on an enlarged scale through the cutting apparatus itself, the section being taken on lines 2—2 of Figures 3 and 5. Figure 3 is a plan with parts in section of the cutting apparatus as seen from line 3—3 of Figure 2. Figure 4 is an elevation of the cutting apparatus from line 4—4 of Figure 2 showing the cutting blades, the housing for said blades being omitted for the sake of clearness.

Figure 5:
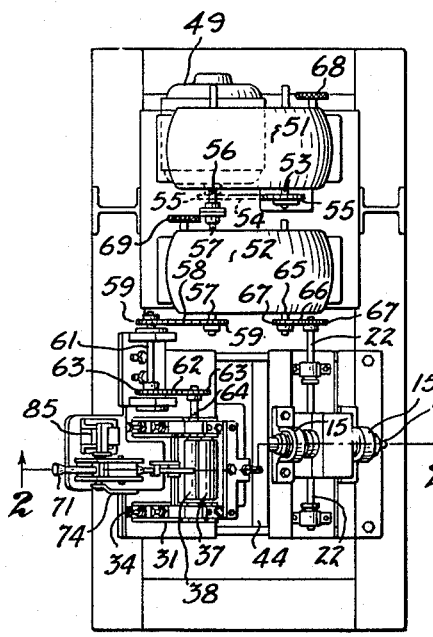
Figure 7:
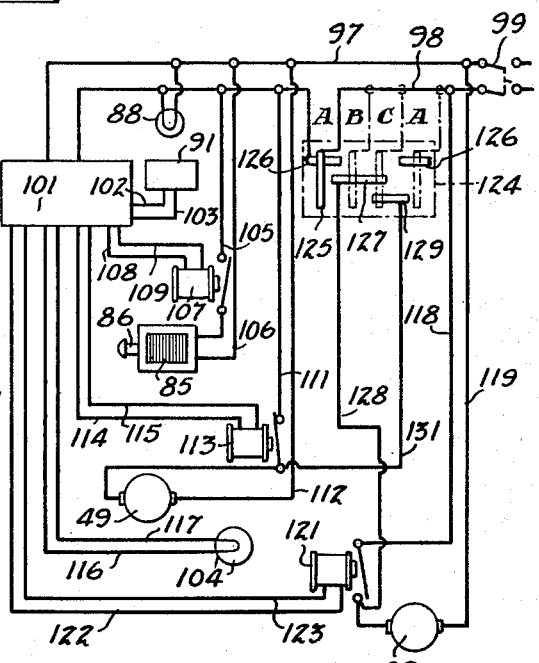

Figure 5 is a plan of the cutting apparatus as a whole from line 5—5 of and on the same scale as Figure 1. Figure 6 is a detail elevation from line 6—6 of Figure 3 showing the actuating solenoid for the mechanism which operates to sever the thread in the event of entangling of the thread or of a deviation of the thread from its normal path of travel. Figure 7 is a wiring diagram showing the circuit employed to perform the hereinafter described operations in the event of interruption of the normal travel of the thread to the cutting blades.

In the drawings, like reference characters refer to like parts throughout.

In the apparatus shown in Figure 1, a plurality of threads 1 are processed on thread-advancing, thread-storage devices 2 of the continuous processing apparatus 3. The threads are combined into a single large thread 1a by the guide 4, from which the thread 1a passes to the cutting apparatus 5. In the latter, the threads 1a are cut into fibers of staple length which drop onto the moving belt 6 of the drying apparatus 7. In the drying apparatus 7, the staple fiber is gradually dried, being discharged from the other end thereof into a suitable receptacle. All of the operations mentioned are performed continuously.

In the illustrated embodiment of the invention, the continuous processing apparatus 3 is generally similar to that shown in the above-mentioned prior application. The thread-advancing reels 2 are of the same type as those disclosed in said application, being generally similar to and operating on the same principle as the thread-advancing reels shown in British Patent No. 413,414. The reels 2 of the present application, like those of said prior application, differ from those of the British patent in that they are supported from one end thereof and have the other end; i. e., the end shown in Figure 1, unobstructed by anything impeding the discharge of the thread. Each of said reels 2 continuously but temporarily stores the thread in a large number of closely spaced generally helical turns which are advanced during rotation of the reel from the supported to the unsupported end thereof.

Suitable processing liquids are applied to the thread on reels 2 from reagent distributors 8, the liquid being collected in troughs 9 disposed beneath said reels.

The continuous processing apparatus 3 may conveniently comprise a plurality of laterally extending series of reels, each of which processes a single thread 1. The reels in each lateral series may to advantage be disposed in offset arrangement with their unsupported ends extending in the same direction so that the supported end of each succeeding reel is in apposite relation to the unsupported end of the preceding reel. The machine as a whole may conveniently be double sided, each side comprising a plurality of said superposed laterally extending series of reels. Preferably, the completely processed wet threads 1 from both sides of the machine are combined into the single large thread 1a of several thousand denier, which may be cut by the improved cutting apparatus of the present invention.

As shown in Figures 2 to 4, inclusive, the illustrated cutting apparatus comprises a rotating cutting head 11 having one or more blades 12, cutting taking place between the blades 12 of the rotating cutting head 11 and the stationary blade 13.

In the improved cutting apparatus of the present invention, the cutting head 11 is mounted on the shaft 14 journalled in spaced bearings 15, which may be thrust-type roller bearings. Bearings 15 are mounted on the frame member 16 of the cutting apparatus which, as shown in Figure 3, comprises side members 17 having fixed thereto suitable cross members 18. Shaft 14 is rotated by means of a helical gear 19 mounted thereon meshing with helical gear 20 driven from shaft 22. The shaft 14 and gear 19 are accurately located endwise by means of spacer collar 23 and by lock nuts 25 threaded on sleeve 26. By adjustment of lock nuts 25 on sleeve 26, the shaft can be accurately located endwise between the bearings 15 to provide the desired operating clearance. Furthermore, by adjustment of nuts 25 wear, if any, can be compensated for. A housing member 27 may be provided as shown to enclose the gears 19 and 20.

As shown in Figure 4, the cutting head 11 in the illustrated embodiment of the invention is provided with four blades 12. Either more or less blades may be employed, the number being dependent upon the speed of travel of the thread, the speed of rotation of the cutting head 11, and the desired length of the staple fiber being cut. As shown in Figure 4, the cutting edge of each blade 12 in the illustrated embodiment of the invention does not coincide with the cutting edge of stationary blade 13 when the blade 12 is in the horizontal position, but is offset therefrom in the direction of rotation of the blades 12. This arrangement results in a wiping or slicing action providing more efficient cutting as compared with the chopping action which would result if the edges of each blade 12 and stationary blade 13 were to coincide.

The stationary blade member 13 with which the rotating blades 12 cooperate to cut the thread 1a into fibers of staple length is mounted on a carriage 28 which includes a cross member 29, on which the blade member 13 is mounted, and spaced upright members 31. Upright members 31 are slidably mounted in guideways 32 mounted on frame 16. They may be locked in position by bolts 33 threaded into upright members 31 passing through slots in said frame 16. Accurate adjustment of the carriage 28 lengthwise of frame member 16 is made possible by differential screws 34 and nuts 35 engaging lugs 36 on the frame and upright members 31. In this manner, the clearance between the stationary blade member 13 and the rotating blades 12, which clearance is of the order of a few thousandths of an inch, can be accurately adjusted.

Rotating blades 12 and stationary blade member 13 are preferably tipped with wear-resistant material, such as tungsten carbide or suitable alloys, to minimize the necessity for re-sharpening or replacement of the blades.

In the illustrated embodiment of the invention, upper and lower nip rolls 37 and 38 are mounted on the carriage 28 in close proximity to stationary blade 13 in order to draw the thread 1a and feed it to the cutting blades. Rolls 37 and 38 are journalled in bearing blocks 39 as shown in Figures 4 and 5 which are disposed in slots 41 in the upright members 31 of the carriage 28. The inner edges of said slots act as guiding surfaces for the slidably mounted bearing blocks 39 for the upper roll 37, which can therefore move upward or downward. Springs 42 adjustably located by bolts 43 mounted on upright members 31 and bearing against the bearing blocks 39 at opposite ends of upper roll 37 serve to urge said roll 37 against lower roll 38 and thus nip the thread 1a between the two rolls. The pressure of the upper roll on the lower can be changed by adjustment of the bolts 43 to vary the compression of springs 42.

A housing 44 may, as shown in the illustrated embodiment of the invention, be provided to enclose the cutting blades 12 to prevent scattering of the cut staple fiber and to provide for the protection of operators. Rotation of the lower roll 38, which is positively driven, causes the rolls to nip between them the thread 1a and feed it to the cutting blades 12. Suitable guiding means are preferably provided in close proximity to the rolls 37 and 38 to guide the thread 1a to the cutting blades. Such guiding means takes the form of a tubular member 45 adjustably mounted by means of bracket 46 on a cross member 47 extending between the upright members 31. In the apparatus shown, a jet of air is supplied from a suitably positioned tube 48 which is connected to a source of compressed air (not shown). The air stream is preferably directed downward on the stationary blade 13 to hold the thread down on said blade and prevent the thread from curling.

The apparatus illustrated as embodying the invention also includes means for easily and accurately changing the length of the staple fiber being produced.

In such apparatus, changes in the length of the product are effected by changing the speed of rotation of the cutting head 11 with respect to the speed of rotation of the lower roll 38. As shown in Figure 5, both the rolls and the rotating cutting head are driven from a common motor 49 through two speed-changing units 51 and 52 which, for the lack of a better term, may be described as being connected in series. As shown in said figure, the driving motor 49 rotates the driving shaft 53 of the first speed-changing unit by means of chain 54 and sprockets 55. The driven shaft 56 of said speed-changing unit 51 is coupled to the driving shaft 57 of the other speed-changing unit 52. This shaft is connected through chain 58, sprockets 59, shaft 61, and chain 62 and sprockets 63 to the shaft 64 for lower roll 38. The driven shaft 65 of said change speed unit 52 is connected by chain 66 and sprockets 67 to rotate the drive shaft 22 from which the cutting head 11 is rotated through helical gears 19 and 20.

By turning adjusting knob 68 on change speed unit 51, the speed of the driven shaft 56 of said unit 51 may be changed with respect to that of driving shaft 53. Since both the nip rolls and cutting head are rotated from shaft 57; i. e., from driven shaft 56, the speed of the apparatus as a whole is changed. The nip rolls and cutting head rotate in timed relation; consequently, the effect is to vary the speed of take-up of the thread from the continuous processing machine. It follows that by such an adjustment, a change may be effected at will in the tension of the thread between the continuous processing apparatus and the cutting apparatus. Under certain circumstances, as where the type of thread is changed, it is necessary that the speed of the continuous processing apparatus be changed, in which case the speed of the cutting apparatus may be by the present invention easily changed to correspond.

By adjustment of the knob 69 of change speed unit 52, the speed of driven shaft 65 of said change speed unit may be varied with respect to the speed of driving shaft 57 of said unit. Consequently, the speed of rotation of the cutting head 11 which is connected to said driven shaft 65 may be changed with respect to the speed of rotation of the nip roll 38, which is driven from driving shaft 57 of said change speed unit. In this manner the length of the product may be varied as desired. As with changes in the speed of the cutting apparatus as a whole, the change in the length of the staple fiber may be made while the cutting apparatus is operating without in any way interfering with the travel of the thread or the operation of the apparatus.

For the reason that accurate control of the speed of the cutter and of the length of the product can thereby be obtained, it is desirable to employ change speed units which provide infinitely but positively variable speed changes such, for example, as those sold under the trade-mark "PIV".

The apparatus of the illustrated embodiment of the invention is also provided with means for halting the cutting operation in the event the thread 1a deviates from its normal path of travel to the cutting blades.

It occasionally happens that the thread, particularly since it is moist, clings to one of the nip rolls 37, 38 and is carried around with said roll. In a very short time, due to the high speed of travel of the thread, the resulting mass becomes great enough to jam and break the cutting apparatus. Again, it happens occasionally that the thread 1a strikes the cutting blade at an angle other than the intended angle, causing the production of staple fiber of varying lengths. It is not practicable in a commercial plant to have an operator watching each cutting apparatus in order to correct such conditions as they arise or to halt the cutting apparatus to prevent breakage of parts; accordingly, the invention provides means for halting the cutting operation in the event that such contingencies occur.

If ordinary cutting apparatus were to be employed in conjunction with apparatus of the type illustrated for the continuous production of the thread 1a, the continuous processing apparatus would have to be halted whenever it were to become necessary to halt the cutting apparatus. After an interruption of this sort, the task of re-starting the thread on all of the thread-advancing reels involves considerable time, labor and expense. Even if it were necessary to stop the cutting apparatus for only a few minutes considerable trouble would be entailed due to the necessity of re-starting the threads throughout the continuous processing apparatus. In order to avoid such difficulties, the invention includes means for halting the cutting operation in the event of deviation or entangling of the thread and, coupled therewith, means providing for continuous withdrawal of the thread from the continuous processing apparatus during the time the cutting apparatus is halted.

In the illustrated embodiment of the invention, a tubular member 71 is disposed with its discharge end adjacent the entrance end of the previously described tubular guiding member 45. This tubular member is pivotally mounted by means of pins 72 journalled in spaced supporting members 73 fixed to the frame 16 of the cutting apparatus. A handle 74 may be mounted as shown on one of said pins to return the tubular member 41 to its original position. Pins 75 mounted on said tubular member and spaced from said pins 72 move in curved slots 76 in supporting members 73. The tubular member 71 is thus capable of arcuate movement in a predetermined path about the axis of pins 72. In normal operation of the cutting apparatus, the thread 1a passes through said tube 71, which is in the position shown in full lines in Figure 2, and thence through tubular member 45 to the nip rolls 37 and 38.

In the event, however, of entangling of the thread about one of the nip rolls or other interruption of the normal cutting action, the tubular member 71 is caused to swing downward about the axis of pins 72 to a position shown by the broken lines 71' in Figure 2. As the tubular member 71 moves downward, the discharge end thereof passes in close proximity to an auxiliary cutting blade 77, adjusted by means of a handle 78, which is mounted between said spaced supporting members 73. The discharge end of tubular member 71 may, if desired, be provided with a cutting sleeve 79 which cooperates with blade 77, which cutting sleeve is preferably removably mounted on said tubular member by means of a bayonet-spring type joint. Therefore, as the tubular member 71 swings downward to the position indicated by broken lines, the thread 1a is severed by the auxiliary blade 77. Means such as spring clip 81 may be provided to hold tubular member 71 in operating position.

Means may also be provided to aid in passing the bundle of filaments through said tubular member 71. In the illustrated embodiment of the invention, an air tube 82 is provided which directs a stream of air through said tubular member in the direction of travel of the thread 1a. A valve 83 is provided to control the air stream supplied to said tube. As the tubular member 71 moves to the position 71', the handle of valve 83 strikes a member 84 carried by one of the spaced supporting members 73 and turns on the valve, so that a stream of air is directed through said tubular member 71 to urge the thread 1a through said tube. Therefore, the thread 1a, having been severed from that portion which has passed through the cutting blades of the cutting apparatus, may continue to pass through said tubular member 71 and be collected below the cutting apparatus.

The auxiliary cutting device represented by tubular member 71 and its associated apparatus may be actuated by various means. In the illustrated apparatus, the tubular member 71 is caused to move in its arcuate path by a solenoid 85 mounted adjacent one of said supporting members 73. The plunger 86 of solenoid 85 is connected to an arm 87 mounted on one of the pins 72 fixed to said tubular member 71, as shown in Figure 6. Movement of the plunger of said solenoid when it is energized by suitable means causes the tubular member 71 to pivot with the results above described.

While various other means might be employed, the apparatus illustrated as embodying the invention is provided with a suitable source of light, such as the bulb 88, which directs a stream of light downward onto the stationary blade member 13. A hole 89 in said stationary blade member 13 is so located as to be covered in the normal operation of the cutting apparatus by the thread traveling to the cutting blades 12. Suitable light sensitive means capable of controlling an electric current, such as a photo-electric cell 91, are provided beneath the stationary blade member 13 in such position that if the hole 89 is not blocked by the thread 1a passing to the cutting blades, the light emitted by the bulb 88 will impinge on the photo-electric cell.

A suitable electric circuit such as that shown in Figure 7 is provided in the illustrated apparatus to connect the photo-electric cell 91 to the solenoid 85. In normal operation of the apparatus, the hole 89 is obstructed by the thread passing to the cutting blades 12, so that no light strikes the photo-electric cell 91. However, if the thread deviates from its normal path, as, for instance, if it happens to wind around one of the nip rolls 37 or 38, the hole 89 is uncovered and the photo-electric cell 91, which is activated by the beam of light passing through said hole, causes the solenoid 85 to move the tubular member 71 to the position indicated by the broken lines 71', thus severing the thread passing to the cutting blades.

A warning signal 104, such as a suitable light or sound device, may be provided to indicate that the cutting apparatus requires attention, such signal being actuated by the photo-electric cell 91 or, if desired, by the solenoid 85.

It is desirable, furthermore, that at the same time that the thread 1a passing to the cutting apparatus is severed, the operation of the cutting apparatus as a whole be halted. This is advantageous since it often happens that, when it tangles, the thread 1a winds about the upper roll 37, causing said roll to jam. The lower roll, being positively driven, continues to rotate and, if it is made of rubber, may be scored and destroyed by the thread tangled about the upper roll 37. If, however, the cutting apparatus is halted as soon as the thread becomes entangled, this difficulty is obviated. To this end, the illustrated apparatus is provided as hereinafter more fully disclosed with means actuated by the photo-electric cell 91 for halting the operation of the cutting apparatus as a whole in the event of deviation of the thread from its predetermined path.

It is desirable, although under certain circumstances not absolutely necessary, to provide an auxiliary motor 92 to aid in withdrawing the thread from the continuous processing apparatus, particularly after the thread proceeding to the cutting apparatus has been severed and is no longer drawn by the nip rolls 37 and 38. A contacting roller 93 carried by the spring-tensioned bracket 94 presses the thread 1a against the pulley 95 on motor 92 to insure sufficient grip to permit the motor 92 to withdraw the thread from the continuous processing apparatus. Preferably, the motor 92 is not driven during normal operation of the cutting apparatus as a whole, since the nip rolls 37, 38 are sufficient to withdraw thread from the processing apparatus. The motor 92 is, however, positively driven after the cutting operation is halted, said motor being actuated from the photo-electric cell 91 at the time the auxiliary cutting means is actuated. In the apparatus shown, the motor 92 is supported by the brackets 96 which also support the guide 4 which combines the separate threads 1 into the thick threads 1a.

Figure 7 is a simplified wiring diagram showing the electrical circuits employed to actuate the various portions of the illustrated apparatus. In the circuit of Figure 7, 97 and 98 are the main lines from which power is supplied, a switch 99 being provided to disconnect the entire apparatus when it is desired to shut it down. The bulb 88 is supplied with current from said lines 97 and 98, as is the amplifier 101 which amplifies the relatively weak currents in the lines 102, 103 comprising the circuit connecting the photo-electric cell 91 to the amplifier. The solenoid 85, drive motor 49 for the cutting apparatus, warning signal 104, and auxiliary motor 92 are controlled by the photo-electric cell 91 through the amplifier 101. Thus the solenoid 85 is connected to the main lines 97 and 98 by lines 105, 106, being controlled from the amplifier 101 by a relay 107 connected to the amplifier 101 by lines 108, 109. When the photo-electric cell 91 is energized by the light beam from the bulb 88, the relay 107 completes the circuit through line 105, the coil of the solenoid and line 106, thus energizing the solenoid and causing the thread 1a to be cut as above described.

The drive motor 49 for the cutting apparatus under ordinary conditions is supplied with power from lines 97, 98 through lines 111 and 112, being controlled from the amplifier 101 by the relay 113 which is connected to the amplifier 101 by lines 114, 115. Therefore, during normal operation of the cutting apparatus the motor 49 is driving the cutting apparatus. When the thread 1a deviates from its normal path and light from bulb 88 strikes photo-electric cell 91, the relay 113 is energized through the amplifier 101, interrupting the circuit in line 111 and halting the motor 49. The warning signal 104 is connected to amplifier 101 by lines 116, 117, and is put into operation through the amplifier 101 when the light beam strikes the photo-electric cell 91 as a result of deviation of the thread 1a from its normal path of travel.

In the circuit of Figure 7, the auxiliary motor 92 does not operate during normal operation of the cutting apparatus as a whole. It is adapted to be connected to the power lines 97, 98 through lines 118 and 119. Relay 121 is connected through lines 122, 123 to the amplifier 101 to control said motor 92 from the photo-electric cell 91. As has been mentioned, during normal operation of the cutting apparatus the motor 92 which withdraws the thread 1a from the continuous processing apparatus is not operating; however, in the event of deviation of the thread and the consequent actuation of the photo-electric cell 91 by a light beam from bulb 88, the impulse from which photo-electric cell 91 is amplified by amplifier 101, the relay 121 completes the circuit through lines 118 and 119 and starts the motor 92.

It is desirable that while the operator is working at the cutting apparatus, as to correct the conditions which caused the thread 1a to deviate from its normal path of travel, obstruction by his hands of the light cast by the bulb 88 on the photo-electric cell 91 should not start up the cutting apparatus as a whole and thus expose him to danger from the rotating blades 12. In starting the thread 1a through the apparatus, it is further desirable that the solenoid 85 be de-energized so that it may be swung to normal operating position and remain there; also, that the motor 49 for driving the cutting apparatus as a whole be capable of operation without being controlled by photo-electric cell 91, since until such time as thread 1a is fed through the nip rolls, hole 89 is unobstructed, permitting the photo-electric cell 91 to halt the motor 49. The illustrated circuit therefore not only provides means for permitting operation of the motor 49 free of control of the photo-electric cell 91 at a time when the solenoid 85 is de-energized, but also provides means for disconnecting from the power source the motor 49, bulb 88, solenoid 85 and warning signal 104, all without halting operation of auxiliary motor 92.

For these purposes, a variety of control systems may be employed. Preferably, however, a control system is used employing the drum switch indicated generally at 124. Said switch 124 comprises a movable contact 125 which is connected to the live side of line 98; a stationary contact 126 connected to the other side of line 98; a stationary contact 127 connected through line 128 to the same side of auxiliary motor 92 as line 118, which is adapted to be connected to said motor under the influence of the photo-electric cell 91; and a stationary contact 129 similarly connected through line 131 to the side of motor 49 to which line 111 is adapted to be connected when not under the influence of photo-electric cell 91.

For normal operation of the apparatus, the circuit is as shown in Figure 7, the movable contact 125 being positioned as shown at A in Figure 7 to complete the circuit through contact 126. Therefore, current is supplied through lines 97 and 98 to bulb 88 and to amplifier 101. The thread 1a, however, prevents light from bulb 88 from striking the photo-electric cell 91. Accordingly, the circuits to the solenoid 85, auxiliary motor 92, and the warning signal 49 are not closed, while the circuit to the cutting apparatus drive motor 49 is closed.

Assuming that the thread 1a is caused to deviate from its normal path of travel, as by winding around one of the nip rolls, the light from bulb 88 strikes photo-electric cell 91.

The resulting impulse is amplified by amplifier 101, which causes the relay 107 to energize solenoid 85, thus cutting the thread 1a before it passes to the blades of the cutting apparatus. It also causes relay 113 to interrupt the circuit to motor 49, thus halting the operation of the cutting apparatus. It further initiates and continues operation of the warning signal 104, indicating to the operator that something is wrong. At the same time, it causes relay 121 to complete the circuit to motor 92 through lines 118 and 119, thus starting operation of the auxiliary motor 92 to aid in withdrawing the thread from the cutting apparatus. The thread 1a is thus caused to pass through the tubular member 71 but not to the nip rolls 37, 38 or cutting blades 12, being aided through tubular member 71 by the air stream from tube 82.

The operator in due course shifts the movable contact 125 of drum switch 124 from the normal operating position A shown in full lines in Figure 7 to cause it to rest upon stationary contact 127, as in some position B. Therefore, everything to the left of switch 124 is disconnected; i. e., the motor 49, the solenoid 85, the bulb 88, the amplifier 101, and warning signal 104. However, direct connection of the motor 92 to lines 97 and 98 is made through lines 119, 128, fixed contact 127 and movable contact 125. Preferably, fixed contact 126 overlaps fixed contact 127 as shown, so that the current to the motor 92 is not interrupted as the contact 125 is moved across fixed contact 127. Consequently, motor 92 is still withdrawing the thread from the processing apparatus while the remainder of the apparatus is disconnected from the circuit to permit the operator to work in safety.

When the operator is ready to start the thread 1a through the cutting apparatus as a whole, he shifts the movable contact 125 to the position C, where it abuts fixed contacts 127 and 129.

As a result, motor 49 is put in operation, since it is connected to lines 97 and 98 through line 112, line 131, fixed contact 129 and movable contact 125, which is connected to line 98. The bulb 88, amplifier 101, solenoid 85, and warning signal 104 are disconnected. The operator then swings the tubular member 71 to the normal operating position, which cuts the thread 1a on the lower edge of auxiliary blade 77 and forms a new leading end which may be fed through tubular guide member 45 by means of an air jet supplied from tube 82 and thence to the rotating nip rolls 37, 38 of the cutting apparatus, after which the air from tube 82 may be shut off by valve 83. The nip rolls 37, 38 seize the thread and feed it to the rotating cutting blades 12. During this time the auxiliary motor 92 has been operating, but, if desired, it can be disconnected by merely moving the contact 125 beyond fixed contact 127.

The cutting apparatus being now in operation, the operator can put the apparatus on control by moving contact 125 to position A.

The illustrated embodiment of the invention is also provided with means for spreading the staple fiber over the belt 6 of the drying apparatus 7 in order to make possible more nearly uniform drying. In the apparatus shown in Figure 1, such means take the form of a rotating disc 132 disposed directly beneath the lower end of housing 44 which rotating disc 132 is mounted at an angle to its axis of rotation. The disc scatters the discharged staple fiber, which may be in the form of short, flat, ribbon-like chips, over the moving drying belt 6. The disc may be rotated by any of various means; for instance, it may be rotated by an individual motor, such as motor 133 shown, or, by means of a flexible shaft, from motor 49.

The cutting apparatus as a whole is preferably disposed as shown with the axis of rotation of the cutting blades 12 inclined from the horizontal; i. e., so disposed that the thread 1a travels in an inclined path.

It is obvious that both in the mechanical and electrical aspects thereof numerous changes may be made in the apparatus illustrated as embodying the invention without in any way departing from the spirit of the invention. It is further obvious that not only thread of the kind described but also many other thread-like articles may be reduced by the apparatus of the invention to fibers of relatively short length; such thread-like articles are intended to be comprehended by the term "thread or the like" as hereinafter used. It is intended that the patent shall cover, by suitable expression in the appended claims, whatever features of patentable novelty reside in the invention.

What is claimed is:

1. Apparatus for severing substantially continuous lengths of thread or the like into relatively short lengths comprising severing means; means for supplying the thread or the like to said severing means; and means for severing the thread or the like before it reaches said first-mentioned severing means in the event of deviation of the unsevered thread or the like from its predetermined path of travel to said first-mentioned severing means.

2. Apparatus for severing substantially continuous lengths of thread or the like into relatively short lengths comprising a source from which thread or the like is continuously supplied; means for severing the thread or the like into relatively short lengths; means for feeding the thread or the like to said severing means; and means for severing the thread or the like and diverting it from its normal path of travel to said first-mentioned severing means in the event of deviation of the unsevered thread or the like from its predetermined path of travel between said source and said first-mentioned severing means.

3. Apparatus for severing substantially continuous lengths of thread or the like into relatively short lengths comprising a source from which the thread or the like is continuously supplied; means for severing the thread or the like into relatively short lengths; means for feeding the thread or the like to said severing means; means for severing the thread or the like and diverting it from its normal path of travel to said first-mentioned severing means in the event of deviation of the unsevered thread or the like from its predetermined path of travel between said source and said first-mentioned severing means; and means for withdrawing the unsevered thread or the like from said source after the thread or the like has been severed by said last-mentioned severing means.

4. Apparatus for severing substantially continuous lengths of thread or the like into relatively short lengths comprising severing means; means for feeding the thread or the like to said severing means; and means for severing the thread or the like before it reaches said first-mentioned severing means and halting the operation of said first-mentioned severing means in the event the unsevered thread or the like becomes entangled in travelling to said first-mentioned severing means.

5. Apparatus for severing substantially continuous lengths of thread or the like into relatively short lengths comprising a source from which the thread or the like is continuously supplied; severing means; means for halting the operation of said severing means in the event the unsevered thread or the like becomes entangled in travelling to said severing means; and means for continuously withdrawing the thread or the like from said source while said severing means are halted.

6. Apparatus for cutting substantially continuous lengths of thread or the like into relatively short lengths comprising cutting means; nip rolls for feeding the thread or the like to said cutting means; and means for severing the uncut thread or the like before it reaches said nip rolls in the event the uncut thread or the like winds about one or more of said nip rolls.

7. Apparatus for cutting substantially continuous lengths of thread or the like into relatively short lengths comprising cutting means; nip rolls for feeding the thread or the like to said cutting means; and means actuated by deviation of the uncut thread or the like from a predetermined path of travel between said nip rolls and said cutting means for severing the thread or the like before it passes to said nip rolls.

8. Apparatus for cutting substantially continuous lengths of thread or the like into relatively short lengths comprising cutting means; nip rolls for feeding the thread or the like to said cutting means; and means for severing the thread or the like before it reaches said nip rolls and halting the operation of said cutting means in the event the uncut thread or the like winds about one or more of said nip rolls.

9. Apparatus for cutting substantially continuous lengths of thread or the like into relatively short lengths comprising a source which continuously supplies thread or the like; cutting means for severing the thread or the like into relatively short lengths; nip rolls for feeding the thread or the like to said cutting means; means for severing the thread or the like before it reaches said nip rolls in the event the uncut thread or the like winds about one or more of said nip rolls; and means for withdrawing the thread or the like from said source after the thread or the like has been severed.

10. Apparatus for severing thread or the like comprising severing means to which the thread or the like is supplied in a predetermined path of travel; means emitting a beam of light in proximity to the unsevered thread or the like while it follows said predetermined path of travel; and, in proximity to the unsevered thread or the like, light-sensitive means adapted to be affected by said light-emitting means to halt the severing operation in the event of deviation of the unsevered thread or the like from said predetermined path of travel.

11. Apparatus for cutting thread or the like comprising a source from which thread or the like is supplied; cutting means; nip rolls for feeding the thread or the like to said cutting means in a predetermined path of travel; means emitting a beam of light on one side of the uncut thread or the like while it follows said predetermined path of travel; light-sensitive means on the other side of the uncut thread or the like, said light-sensitive means being affected by the light beam from said light-emitting means in the event of deviation of the uncut thread or the like from said predetermined path of travel; means actuated by said light-sensitive means for severing the thread or the like before it reaches said nip rolls; and means for withdrawing the thread or the like from said source after the thread or the like has been severed.

12. Apparatus for cutting thread or the like comprising a pair of nip rolls for feeding the thread or the like; a stationary blade over which the thread or the like passes from said nip rolls; a moving cutting blade which cooperates with said stationary blade to cut the thread or the like; and means for applying a jet of fluid in a direction holding the thread or the like in position on said stationary blade.

13. Apparatus for cutting substantially continuous lengths of thread or the like into fibers of relatively short length comprising cutting means; conveying means disposed below said cutting means adapted to receive the cut lengths of thread or the like; and, disposed between said cutting means and said conveying means, rotating means operating to scatter the cut lengths of thread or the like substantially uniformly over said conveying means.

14. Apparatus for cutting substantially continuous lengths of thread or the like into fibers of relatively short length comprising cutting means; conveying means disposed below said cutting means adapted to receive the cut lengths of thread or the like; a rotatable disc-like member disposed beneath said cutting means mounted at an angle to its axis of rotation, whereby the cut lengths of thread or the like are spread over said conveying means; and means for rotating said disc-like member.

15. Apparatus for cutting thread or the like comprising a source from which thread or the like is supplied; at least one roll for feeding the thread or the like; a stationary blade over which the thread or the like is passed by said roll in a predetermined path of travel; a moving cutting blade which cooperates with said stationary blade to cut the thread or the like; means emitting a beam of light in proximity to the uncut thread or the like passing over said stationary blade; light-sensitive means disposed in proximity to the portion of said thread or the like passing over said stationary blade, said light-sensitive means being affected by said light-emitting means to halt the cutting operation in the event of a deviation or absence of the uncut thread or the like from said predetermined path of travel over said stationary blade; and means for applying a jet of fluid in a direction tending to hold said uncut thread or the like in said predetermined path of travel over said stationary blade.

16. Apparatus for cutting thread or the like comprising a source from which thread or the like is supplied; at least one roll for feeding the thread or the like; a stationary blade over which the thread or the like is passed by said roll in a predetermined path of travel; a moving blade which cooperates with said stationary blade to cut the thread or the like; means emitting a beam of light in proximity to the uncut thread or the like passing over said stationary blade; light-sensitive means disposed in proximity to the portion of said thread or the like passing over said stationary blade, said light-sensitive means being affected by said light-emitting means to halt the cutting operation in the event of a deviation or absence of the uncut thread or the like from said predetermined path of travel over said stationary blade; and means for urging said uncut thread or the like against said stationary blade to guide said thread or the like in said predetermined path of travel over said stationary blade without substantially impeding the motion of the thread or the like over said stationary blade imparted by said roll.

17. Apparatus for cutting thread or the like comprising a source from which thread or the like is supplied; at least one roll for feeding the thread or the like; a stationary blade over which the thread or the like is passed by said roll in a predetermined path of travel; a moving cutting blade which cooperates with said stationary blade to cut the thread or the like; means emitting a beam of light on one side of the uncut thread or the like passing over said stationary blade; light-sensitive means on the other side of the uncut thread or the like passing over said stationary blade, said light-sensitive means being affected by said light-emitting means to halt the cutting operation in the event of a deviation or absence of the uncut thread or the like from said predetermined path of travel over said stationary blade; and means for applying a jet of fluid in a direction tending to hold said uncut thread or the like in said predetermined path of travel over said stationary blade.

18. Apparatus for severing thread or the like comprising a source from which thread or the like is supplied; at least one roll for feeding the thread or the like; severing means to which the thread or the like is passed by said roll; a stationary surface between said roll and said severing means over which the thread or the like is passed in a predetermined path by said roll to said severing means; means emitting a beam of light in proximity to the unsevered thread or the like passing over said stationary surface; light-sensitive means disposed in proximity to the unsevered thread or the like passing over said stationary surface, said light-sensitive means being affected by said light-emitting means in the event of a deviation or absence of the unsevered thread or the like from said predetermined path of travel over said stationary surface; and means for urging said thread or the like in said predetermined path of travel over said stationary surface without substantially impeding the motion of the thread or the like over said stationary surface imparted by said roll.

19. Apparatus for cutting thread or the like comprising at least one roll for feeding the thread or the like; a stationary surface over which the thread or the like is urged by said roll; a moving cutting blade to which said thread or the like is passed by said roll; and means for urging said uncut thread or the like against said stationary surface without substantially impeding the motion imparted thereto by said roll.

LAVERN J. JORDAN.